(12) United States Patent
Hatasaki et al.

(10) Patent No.: US 7,516,353 B2
(45) Date of Patent: **\*Apr. 7, 2009**

(54) FALL OVER METHOD THROUGH DISK TAKE OVER AND COMPUTER SYSTEM HAVING FAILOVER FUNCTION

(75) Inventors: Keisuke Hatasaki, Yokohama (JP); Takao Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/153,315

(22) Filed: May 16, 2008

(65) Prior Publication Data

US 2008/0235533 A1 Sep. 25, 2008

Related U.S. Application Data

(63) Continuation of application No. 11/033,724, filed on Jan. 13, 2005.

(30) Foreign Application Priority Data

Dec. 9, 2004 (JP) ............................. 2004-356159

(51) Int. Cl.
   *G06F 11/00* (2006.01)
(52) U.S. Cl. .............................................. 714/3; 714/7
(58) Field of Classification Search ................ 714/3, 714/4, 7, 15
   See application file for complete search history.

(56) References Cited

U.S. PATENT DOCUMENTS

| 5,386,544 A | 1/1995 | Nakamura |
| 5,996,086 A | 11/1999 | Delaney et al. |
| 6,510,496 B1 | 1/2003 | Tarui et al. |
| 6,715,100 B1 | 3/2004 | Hwang |
| 6,922,791 B2 | 7/2005 | Mashayekhi et al. |
| 7,062,674 B2 | 6/2006 | Takamoto |
| 7,178,059 B2 | 2/2007 | Greenspan et al. ............ 714/13 |
| 7,240,234 B2 | 7/2007 | Morita et al. .................. 714/4 |
| 7,346,800 B2 | 3/2008 | Hatasaki et al. |
| 2003/0051187 A1 | 3/2003 | Mashayekhi et al. .......... 714/4 |
| 2003/0217088 A1 | 11/2003 | Takamoto |
| 2006/0015773 A1 | 1/2006 | Singh et al. ................... 714/13 |
| 2006/0190760 A1 | 8/2006 | Saika ............................ 714/4 |
| 2006/0195508 A1 | 8/2006 | Bernardin et al. ........... 709/203 |

*Primary Examiner*—Scott T Baderman
*Assistant Examiner*—Paul F Contino
(74) *Attorney, Agent, or Firm*—Mattingly, Stanger, Malur & Brundidge, P.C.

(57) ABSTRACT

When a primary server executing a task fails in a computer system where a plurality of servers are connected to an external disk device via a network and the servers boot an operation system from the external disk device, task processing is taken over from the primary server to a server that is not executing a task in accordance with the following method. The method for taking over a task includes the steps of detecting that the primary server fails; searching the computer system for a server that has the same hardware configuration as that of the primary server and that is not running a task; enabling the server, searched for as a result of the search, to access the external disk device; and booting the server from the external disk device.

6 Claims, 20 Drawing Sheets

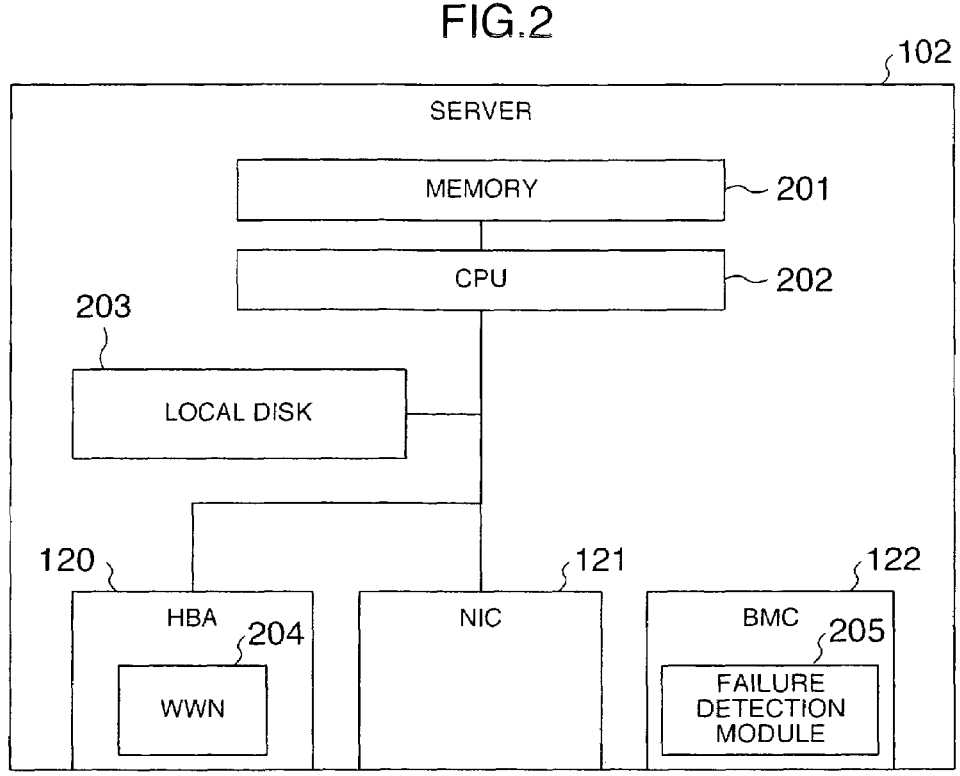
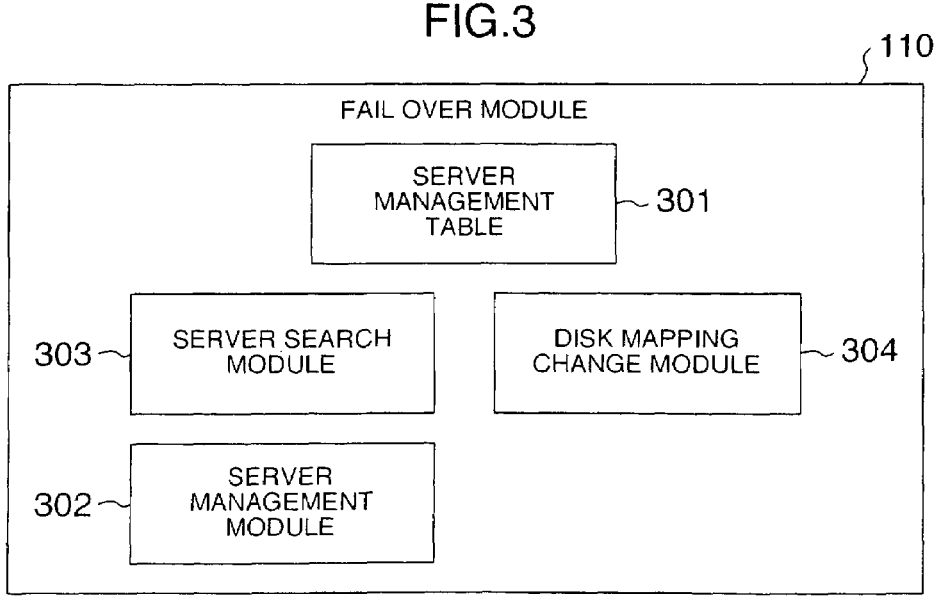

FIG.4
SERVER MANAGEMENT TABLE

| SERVER IDENTIFIER | CPU TYPE | CPU FREQUENCY | MEMORY CAPACITY | PARTITION CONFIGU-RATION | STATUS |
|---|---|---|---|---|---|
| S1 | CPU1 | 2GHz | 2GB | 1(P1) | IN USE |
| S2 | CPU2 | 4GHz | 8GB | 2(P2) | IN USE |
| S3 | CPU2 | 4GHz | 8GB | 2(P2) | IN USE |
| S4 | CPU1 | 2GHz | 2GB | 1(P4) | IN USE |
| S5 | CPU1 | 2GHz | 2GB | 1(P5) | NOT IN USE |
| S6 | CPU2 | 4GHz | 8GB | 2(P6) | NOT IN USE |
| S7 | CPU2 | 4GHz | 8GB | 2(P6) | NOT IN USE |
| S8 | CPU1 | 1GHz | 1GB | 1(P8) | NOT IN USE |
| S9 | CPU1 | 2GHz | 2GB | 1(P9) | NOT IN USE |
| S10 | CPU1 | 2GHz | 2GB | 1(P10) | IN USE |
| S11 | CPU2 | 2GHz | 1GB | 1(P11) | NOT IN USE |
| S12 | CPU2 | 2GHz | 1GB | 1(P12) | FAILED |

FIG.5

SERVER MANAGEMENT MODULE

FAILURE OPERATION TABLE

| FAILURE TYPE | OPERATION |
|---|---|
| ABNORMAL TEMPERATURE | EXECUTE FAIL OVER |
| CPU ERROR | EXECUTE FAIL OVER |
| MEMORY ERROR | NONE |
| FAN STOPPED | NONE |

FIG.7

DISK MAPPING MODULE

DISK MAPPING TABLE

| WWN | VIRTUAL DISK NUMBER | PHYSICAL DISK NUMBER |
|---|---|---|
| WWN1 | LU0 | LU10 |
| WWN2 | LU1 | LU11 |
| WWN3 | LU3 | LU17 |
| WWN4 | LU0 | LU21 |
| | LU1 | LU22 |

FIG.6

DISK MAPPING CHANGE MODULE

SERVER DISK MAPPING TABLE

| SERVER | WWN | VIRTUAL DISK NUMBER | PHYSICAL DISK NUMBER |
|---|---|---|---|
| S1 | WWN1 | LU0 | LU10 |
| S2 | WWN2 | LU1 | LU11 |
| S3 | WWN3 | LU3 | LU17 |
| S4 | WWN4 | LU0 | LU21 |
| | | LU1 | LU22 |
| S5 | WWN5 | — | — |
| S6 | WWN6 | — | — |
| S7 | WWN7 | — | — |
| S8 | WWN8 | — | — |

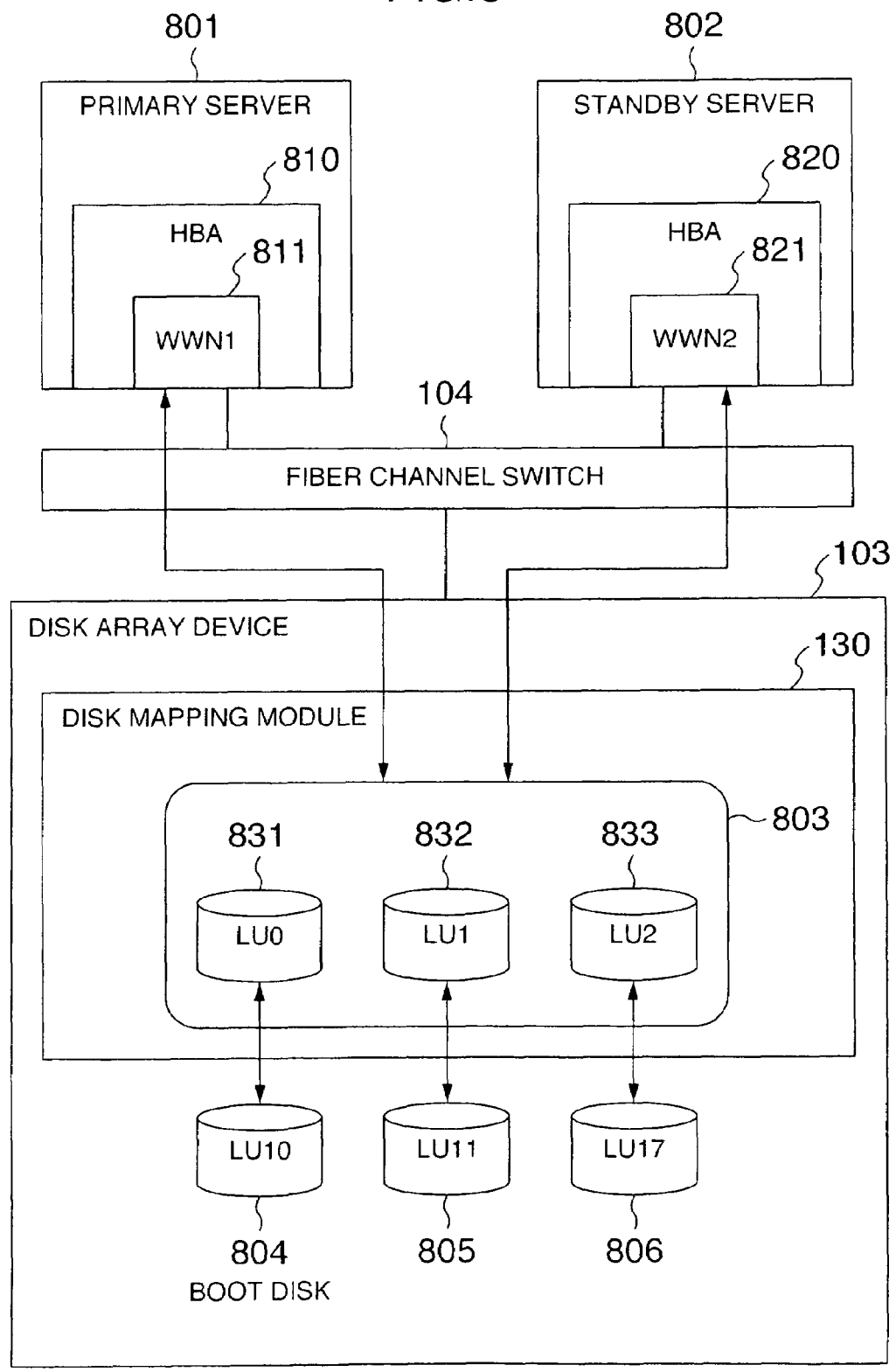

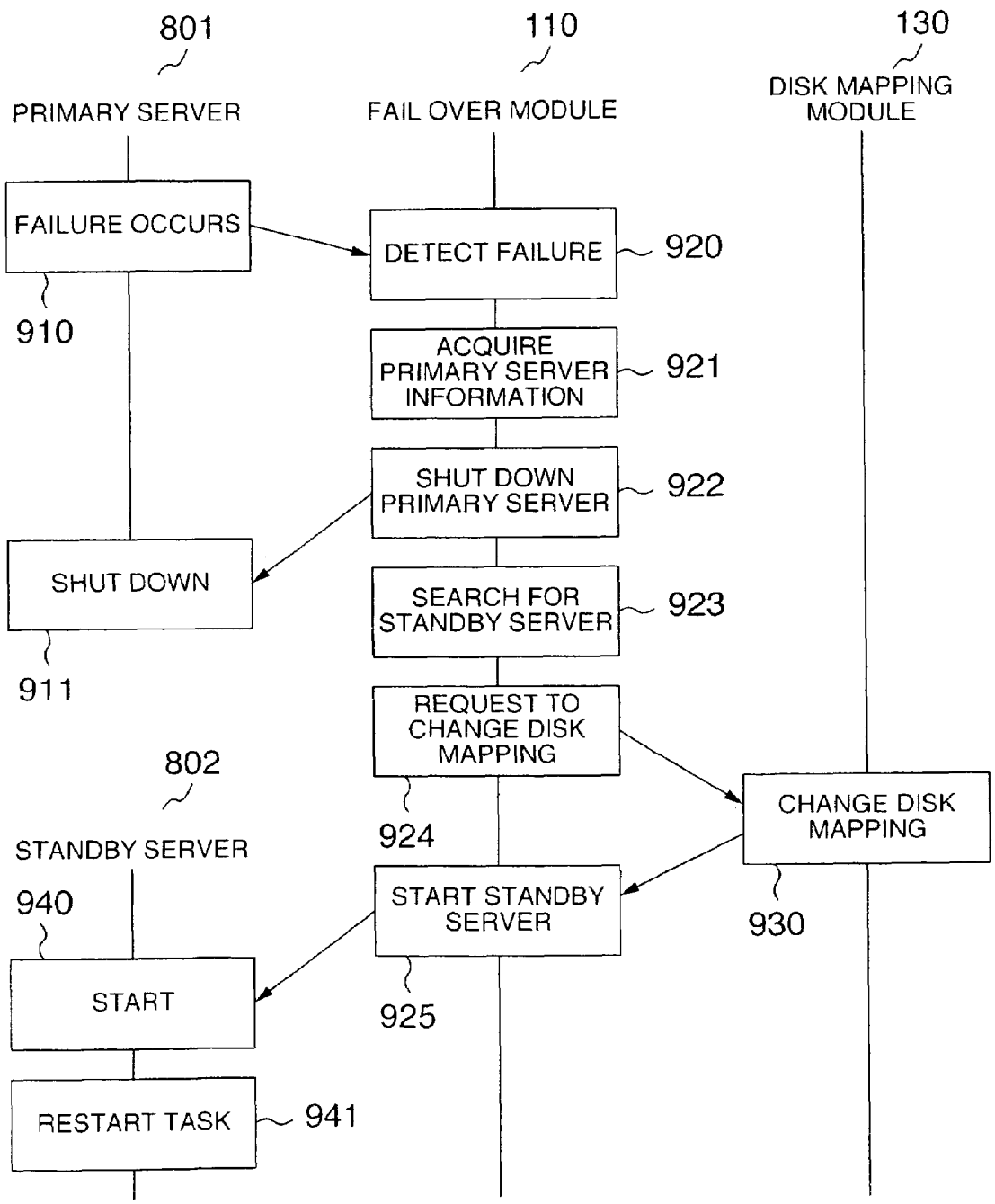

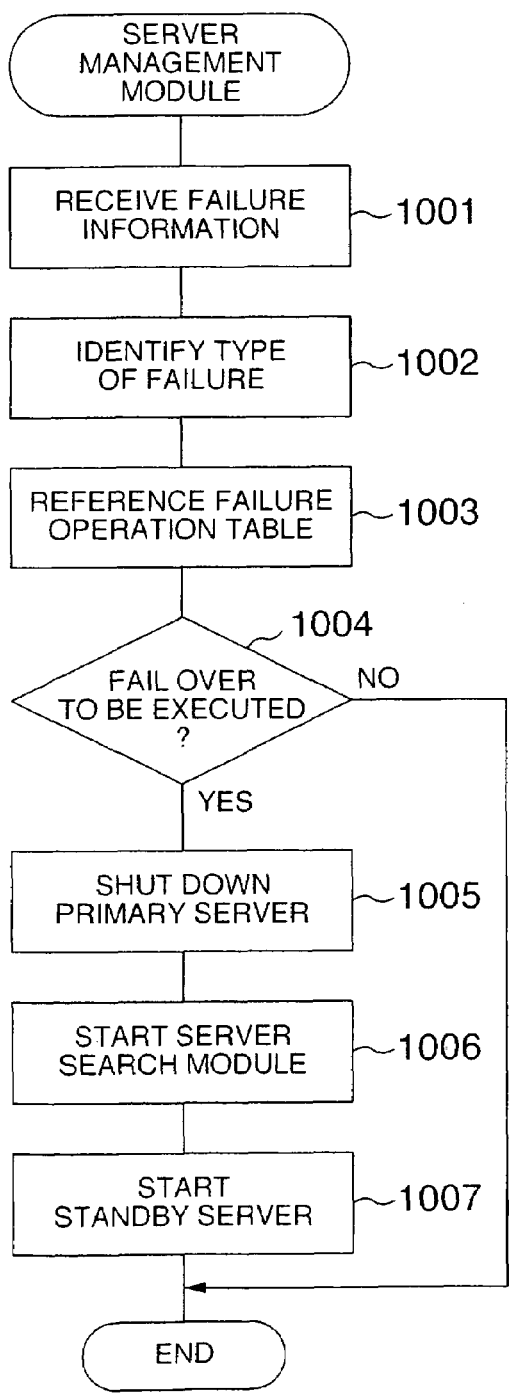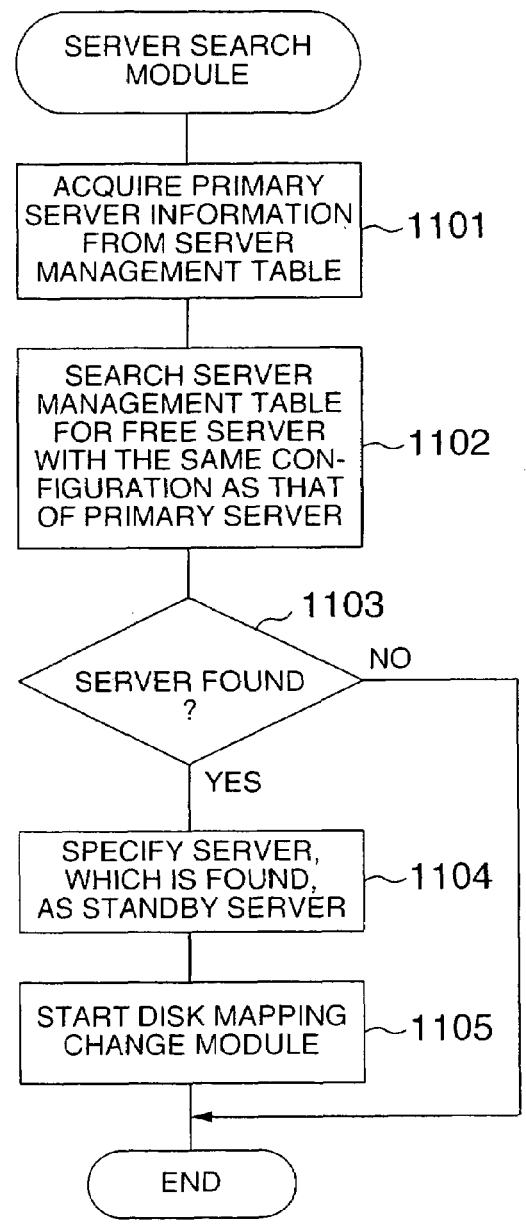

FIG.15
PARTITION CONFIGURABLE TABLE

| NUMBER OF SERVERS (1501) | COMBINATION OF SERVERS FOR CONFIGURING LOGICAL SERVER (1502) |
|---|---|
| 2 | S2,S3 |
| 2 | S6,S7 |
| 2 | S11,S12 |
| 3 | S2,S3,S6 |
| 4 | S2,S3,S6,S7 |
| 5 | NONE |

FIG.16
PARTITION MANAGEMENT TABLE

| PARTITION IDENTIFIER (1601) | CONFIGURING SERVERS (1602) |
|---|---|
| P1 | S1 |
| P2 | S2,S3 |
| P3 | — |
| P4 | S4 |
| P5 | S5 |
| P6 | S6,S7 |
| P7 | — |
| P8 | S8 |
| P9 | S9 |
| P10 | S10 |
| P11 | S11 |
| P12 | S12 |

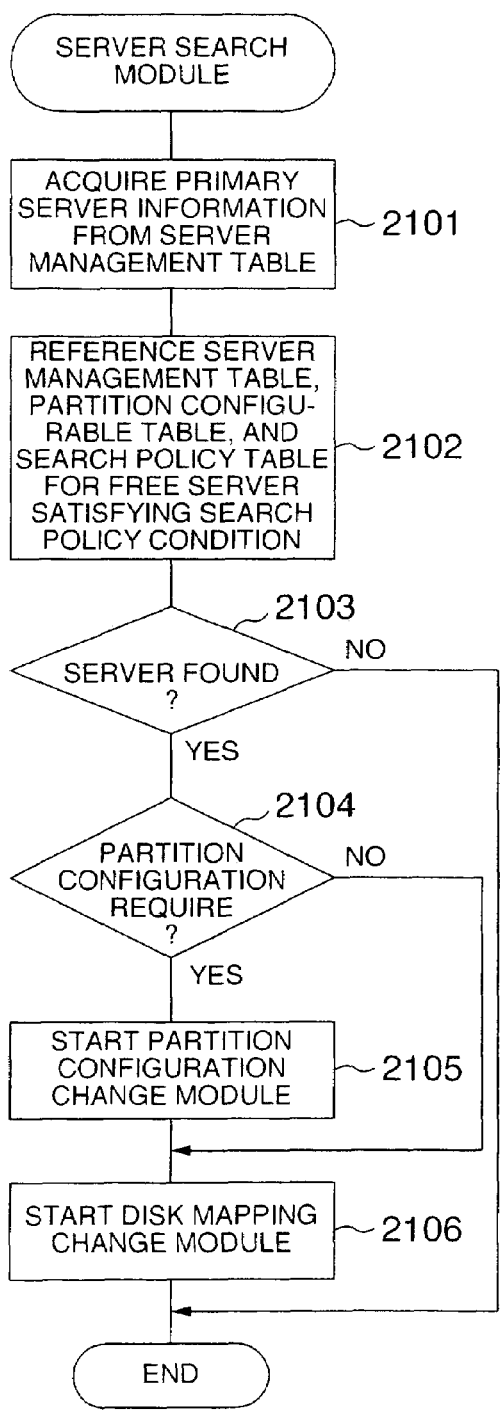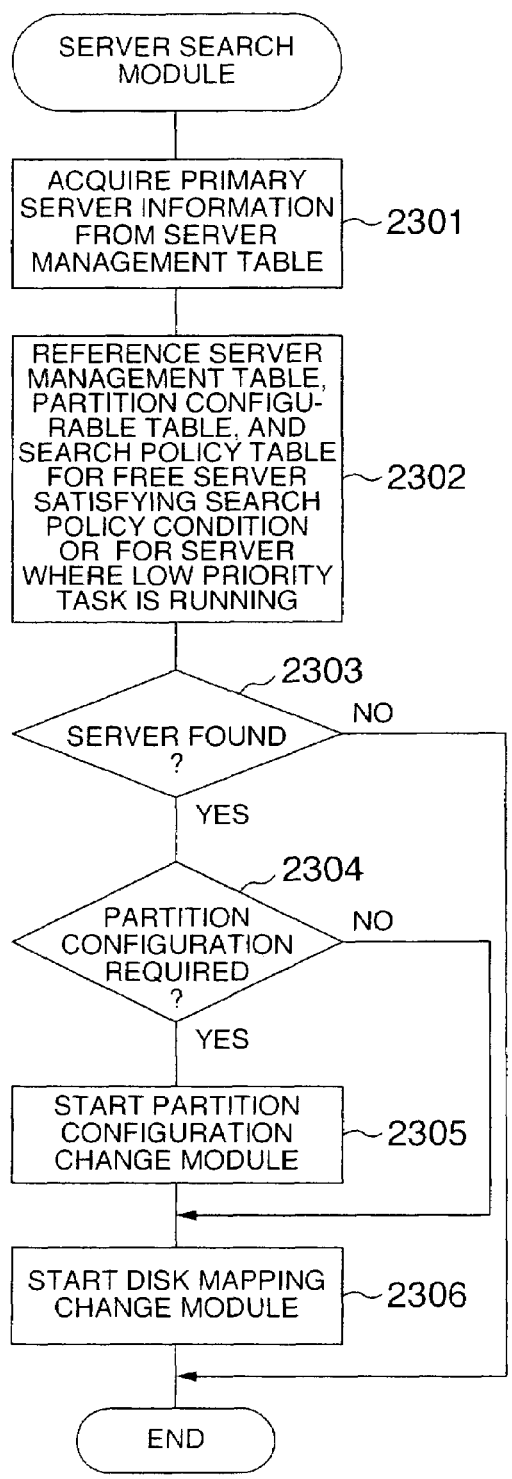

FIG.22
SERVER MANAGEMENT TABLE

| SERVER IDENTIFIER | CPU TYPE | CPU FREQUENCY | MEMORY CAPACITY | PARTITION CONFIGU-RATION | STATUS | TASK TYPE | PRIORITY |
|---|---|---|---|---|---|---|---|
| S1 | CPU1 | 2GHz | 2GB | 1(P1) | IN USE | Web1 | LOW |
| S2 | CPU2 | 4GHz | 8GB | 2(P2) | IN USE | DB2 | HIGH |
| S3 | CPU2 | 4GHz | 8GB | 2(P2) | IN USE | DB2 | HIGH |
| S4 | CPU1 | 2GHz | 2GB | 1(P4) | IN USE | AP3 | MEDIUM |
| S5 | CPU1 | 2GHz | 2GB | 1(P5) | IN USE | Web4 | HIGH |
| S6 | CPU2 | 4GHz | 8GB | 2(P6) | IN USE | DB5 | MEDIUM |
| S7 | CPU2 | 4GHz | 8GB | 2(P6) | IN USE | DB5 | MEDIUM |
| S8 | CPU1 | 1GHz | 1GB | 1(P8) | IN USE | AP6 | LOW |
| S9 | CPU1 | 2GHz | 2GB | 1(P9) | IN USE | Web7 | MEDIUM |
| S10 | CPU1 | 2GHz | 2GB | 1(P10) | IN USE | DB8 | MEDIUM |
| S11 | CPU2 | 2GHz | 1GB | 1(P11) | IN USE | Web7 | MEDIUM |
| S12 | CPU1 | 1GHz | 1GB | 1(P12) | NOT IN USE | — | — |

401  402  403  404  405  406  407  408

FIG.26
SERVER MANAGEMENT TABLE

| SERVER IDENTIFIER | CHIP SET | NUMBER OF NIC PORTS | NUMBER OF HBA PORTS | VLAN ID | Zone | CONNECTED TO NW-SW | CONNECTED TO ARRAY DEVICE |
|---|---|---|---|---|---|---|---|
| S1 | CS1 | 1 | 2 | 1 | 1 | SW1 | Array1 |
| S2 | CS2 | 1 | 1 | 2 | 2 | SW1 | Array2 |
| S3 | CS2 | 1 | 1 | 2 | 2 | SW1 | Array2 |
| S4 | CS1 | 1 | 2 | 3 | 3 | SW1 | Array1 |
| S5 | CS1 | 1 | 1 | 1 | 1 | SW1 | Array1 |
| S6 | CS2 | 1 | 1 | 2 | 2 | SW1 | Array2 |
| S7 | CS2 | 1 | 2 | 2 | 2 | SW1 | Array2 |
| S8 | CS1 | 1 | 1 | 3 | 3 | SW1 | Array1 |
| S9 | CS3 | 1 | — | 1 | 1 | SW2 | Array1 |
| S10 | CS1 | 2 | 1 | 1 | — | SW2 | — |
| S11 | CS2 | 1 | 1 | 2 | 2 | SW2 | Array1 |
| S12 | CS2 | 1 | 1 | 2 | 2 | SW2 | Array1 |

FALL OVER METHOD THROUGH DISK TAKE OVER AND COMPUTER SYSTEM HAVING FAILOVER FUNCTION

CROSS-REFERENCE TO RELATED APPLICATION

The present application is a continuation of application Ser. No. 11/033,724, filed Jan. 13, 2005; which claims priority from Japanese application JP 2004-356159 filed on Dec. 9, 2004, the contents of which are hereby incorporated by reference into this application.

BACKGROUND OF THE INVENTION

The present invention relates to a fail over method used in a computer system where servers are booted from an external disk.

In general, a server boots an OS (Operating System) installed in a built-in disk device. A system using this configuration conventionally has a redundant configuration in which the OS and the applications on the disk built in a server are installed on the disks of a plurality of servers for use in taking over a task when the server fails. In this method, when an operating server (primary server) executing a task fails, another server (standby server), in which the same OS and the applications are installed, is started to take over the task. However, this method requires each primary server to have a standby server with which to pair, increasing the cost and manpower required for the initial installation.

Another method is that a server uses an external disk array device as a disk device for booting. In this case, because the disk array device can be connected to a plurality of servers via a fiber channel or a fiber channel switch, the boot disk of a server connected to the disk array device can be referred by another server. Therefore, even if a primary server executing a task fails in this configuration, a standby server can be started using the boot disk of the primary server to take over the task. Because the content of the boot disk is taken over directly to the standby server in this method, the OS and the applications are taken over directly. In addition, this method eliminates the need for preparing a standby server with which to pair, allowing the task to be taken over from any primary server to any standby server. The problem with this method is that, when the hardware configuration of the primary server differs from that of the standby server, the OS or the applications on the boot disk sometimes do not operate properly.

The conventional method solves this problem by requiring the user to set up a standby server with the hardware configuration equivalent to that of the primary server assuming that both systems should have the equivalent hardware configuration. However, this method increases user's manpower for the initial installation. In addition, because the task can be taken over in some cases even if there is a slight difference in the hardware configuration such as the CPU speed or the memory capacity, a server with the same hardware configuration need not always be prepared.

In addition, when the partition function is used where a plurality of servers are configured virtually as one logical server as shown in U.S. Pat. No. 6,510,496, the partition configuration of a primary logical server must be matched with that of a standby logical server. However, once a standby logical server is set up in such a way that its partition configuration matches with that of a primary logical server, the standby logical server cannot take over a task from some other primary logical server that has a different partition configuration. This requires the user to prepare a standby logical server that always forms a pair with the primary logical server, increasing the initial installation cost and the initial buildup cost.

SUMMARY OF THE INVENTION

The object of the present invention is to provide a method for taking over a task through boot disk take over when a server that boots an OS from an external disk fails. For use in a system where servers have different hardware configurations, this method eliminates the need for selecting, or configuring the partition of, a server that will take over the task of a failed server in order to reduce the manpower and the installation cost required for initial system installation.

To set up a standby server manually, the user can select any standby server if the hardware configuration is the same. However, in setting up a standby server in a system where servers have different hardware configurations, the user must investigate the hardware configuration of the primary server, investigate the hardware configuration of a candidate for the standby server, and select a matching server. This job is tiresome.

In addition, one standby server is usually set up for a plurality of primary servers for taking over a task. Thus, in a system where the partition function is used, the configuration of the standby logical server is determined when a primary logical server fails. This means that the user must monitor if a failure occurs and that, if a failure occurs, the user must manually configure the partition. This significantly increases the operation cost. In addition, depending upon the configuration of standby servers, a standby logical server with the same configuration as that of the primary server cannot be configured in some cases, for example, because of an insufficient number of standby servers.

When a primary server executing a task fails in a computer system where a plurality of servers are connected to an external disk device via a network and the servers boot an operation system from the external disk device, task processing is taken over from the primary server to a server that is not executing a task in accordance with the following method. The method for taking over a task includes the steps of detecting that the primary server fails; searching the computer system for a server that has the same hardware configuration as that of the primary server and that is not running a task; enabling the server, searched for as a result of the search, to access the external disk device; and booting the server from the external disk device.

The present invention provides a method for taking over a boot disk when a server that boots a system from an external disk device fails. This method implements a fail over method that eliminates the need for selecting a server, which will take over a task, from the servers having different hardware configuration and for configuring a partition, thereby reducing the manpower and the installation cost required for the initial system installation.

Other objects, features and advantages of the invention will become apparent from the following description of the embodiments of the invention taken in conjunction with the accompanying drawings.

BRIEF DESCRIPTION OF THE DRAWINGS

FIG. 2 is a block diagram showing the configuration of a server in the embodiment described above.

FIG. 3 is a functional block diagram showing the configuration of a management server in the embodiment described above.

FIG. 4 is a format diagram showing a server management table in the embodiment described above.

FIG. 5 is a functional block diagram showing the configuration of a server management module in the embodiment described above.

FIG. 6 is a functional block diagram showing a disk mapping change module in the embodiment described above.

FIG. 7 is a functional block diagram showing a disk mapping module in the embodiment described above.

FIG. 8 is a conceptual diagram showing the configuration of disk mapping to the severs in the embodiment described above.

FIG. 9 is a sequence diagram showing the operation in the embodiment described above.

FIG. 10 is a flowchart showing the processing of the server management module.

FIG. 11 is a flowchart showing the processing of a server search module.

FIG. 15 is a format diagram showing a partition configurable table in the embodiment described above.

FIG. 16 is a format diagram showing a partition management table in the embodiment described above.

FIG. 21 is a flowchart showing the processing of the server search module in the embodiment described above.

FIG. 22 is a format diagram showing a server management table in the fourth embodiment of the present invention.

FIG. 23 is a flowchart showing the processing of a server search module in the embodiment described above.

FIG. 26 is a format diagram showing a server management table in the embodiment described above.

DESCRIPTION OF THE EMBODIMENTS

Figure 1:
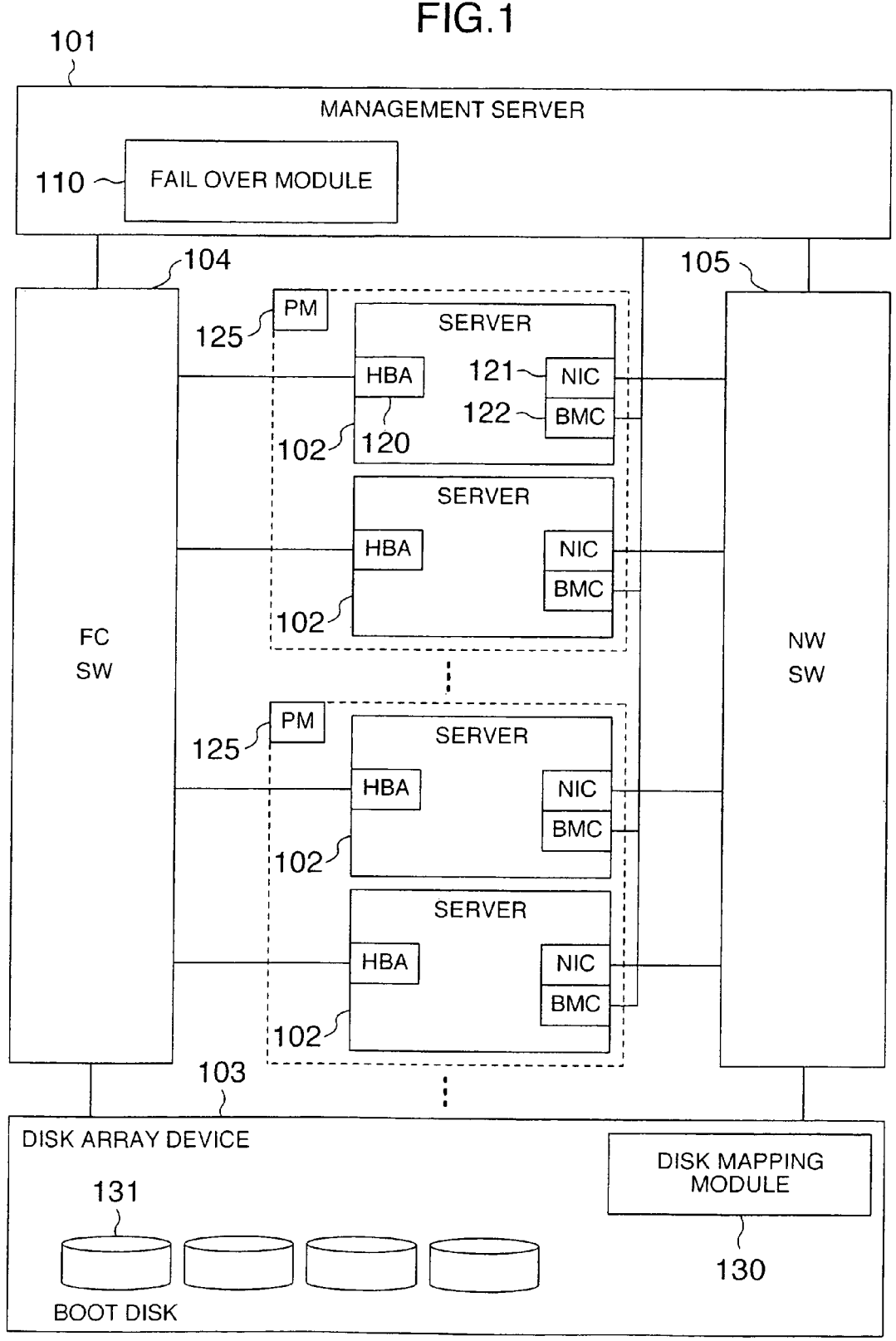
FIG. 1 is a block diagram showing the general configuration of a first embodiment of the present invention.

FIG. 1 is a diagram showing the general configuration of an embodiment of the present invention. A system in this embodiment has a plurality of servers 102. Each server is connected to a network switch (NW SW) 105 via a network interface card (NIC) 121, and to a fiber channel switch 104 via a host bus adapter (HBA) 120 of the fiber channel. The fiber channel switch 104, also connected to a disk array device 103, allows the server 102 to access the disk array device 103. The network switch 105 is connected also to a management server 101 that manages the system. Each of the servers 102 contains a BMC (Baseboard Management Controller) 122. The BMC 122 is connected to the management server 101 via a network. This connection allows the management server 101 to monitor the hardware status of, and control the power supply to, the servers. In addition, the server 102 comprises a partition module 140. In the embodiment shown, the partition module 140 switches the configuration of two servers between the configuration in which two servers are treated as one logical server and the configuration in which each of two servers is treated as an individual logical server. More specifically, in the former case, each server in the same partition can access the memory of the other server as if that memory is the memory installed in the server itself.

Increasing the maximum number of servers, included in one partition, from two to three or more enables the logical server configuration to be switched in a variety of ways. The management server 101 monitors the status of the servers 102, the disk array device 103, the fiber channel switch 104, and the network channel switch 105 and, as necessary, controls those components via the network. The management server 101 has a fail over module 110. The fail over module 110, one of the features of the present invention, receives a failure notification from the BMC 122 when a server fails, controls the power of the BMC 122, and controls a disk mapping module 130 in the disk array device 103. The disk mapping module 130 in the disk array device 103 establishes the relation between the HBA 120 installed in the servers 102 and the disks 131. More specifically, the disk mapping module 130 implements the security function by limiting the servers having access to the disks 131. In a first embodiment, the server 102 uses a disk 131 in the disk array device 103 as the boot disk where the OS and applications are stored.

FIG. 2 is a diagram showing the detailed configuration of the server 102 in this embodiment. The server 102 comprises a memory 201 that stores programs and data, a CPU 202 that executes a program in the memory, the HBA 120, the NIC 121, and the BMC 122. The HBA 120 stores in the memory a unique device identifier called a WWN (World Wide Name) 204 required for identifying the other end of communication during fiber channel communication. The BMC 122 primarily monitors and controls the hardware of the server 102. When an error occurs in the hardware of the server 102, a failure detection module 205 detects it and informs the error to an external unit. The BMC 122 also allows the power of the server 102 to be turned on or off remotely.

FIG. 3 is a diagram showing the configuration of the program modules in the fail over module 110. The fail over module 110 comprises a server management table 301 that stores the configuration status of the hardware and the partitions of the servers as well as the usage status of the servers; a server management module 302 that monitors the status of the servers, starts the fail over operation when a failure is detected, and controls the power supply of the server; a server search module 303 that searches for a standby server that will take over the task when a fail over occurs; and a disk mapping change module 304 that changes the disk mapping so that the disks mapped to the primary server are mapped to the standby server when a fail over occurs.

FIG. 4 is a diagram showing the detail of the server management table 301 shown in FIG. 3. The server management table 301 stores a list of servers to be managed by the fail over module 110 and the configuration information and the status of the servers. A column 401 of the table contains a server identifier. The server identifier 401 may be any information that can identify a server. For example, the server serial number and, if the server is a blade server, the blade number may be used. A column 402 contains the CPU type of the server. Even when the CPU product name is the same, this column contains information used to identify the CPU type if the stepping (version) is different. A column 403 contains the CPU frequency of the server. A column 404 contains the capacity of memory installed on the server. A column 405 contains the partition configuration of the server. The numeral in the column indicates the number of servers constituting the partition to which this server belongs, and the identifier of the partition, to which the server belongs, is shown in parentheses. The partition identifier is assigned to a logical server.

For example, if the servers with server identifiers S2 and S3 configure one logical server, the number of servers constituting the partition is 2 for both S2 and S3 and they belong to the partition with the same partition identifier P2. In some cases, only one server configures a logical server. In this case, the server is equivalent to a server with no partition function. In this embodiment, primary servers and standby server are all logical servers. In a system with no partition function, physical servers are used as primary servers and standby servers. A column 406 contains the status of the server. "In use" means that the server is executing a task. "Not in use" means that the server is now available for a task. When the server fails and is not available for use, information indicating that the server has failed is stored.

FIG. 5 is a diagram showing the detail of the server management module 302 in FIG. 3. The server management module monitors the status of the servers, monitors the operating status and failure of the servers, and controls the power supply. When a server fails, the BMC 122 shown in FIG. 1 or the agent program running in the server detects the failure of the server and sends a notification to the server management module 302 to indicate that the failure has occurred. The failure information sent as the notification at this time includes the type of failure. The server management module 302 has a failure operation table to decide whether to execute fail over depending upon the type of failure. A column 501 indicates the type of a failure that has occurred, and column 502 indicates whether to execute fail over when the failure occurred. The information stored in the failure operation table can also be set freely by a system user.

FIG. 6 is a diagram showing the detail of the disk mapping change module 304 in FIG. 3. The disk mapping change module 304 releases all disks mapped to the primary server that has failed and requests that the disks be mapped to the standby server that is to take over the task. This mapping change request is sent to the disk mapping module 130 in the disk array device 103 shown in FIG. 1. The disk mapping module 130 allocates disks to the WWN that is the identifier of the HBA in a server. Therefore, to change the disk mapping, information on the disks mapped to the WWN of the primary server and the WWN of the standby server are required. The disk mapping change module 304 stores the information in the server disk mapping table. A column 601 indicates a server identifier. A column 602 indicates the WWN of the HBA of a server. A column 603 indicates the virtual disk number of a disk allocated to the WWN. A column 604 indicates the physical disk number of the disk. A virtual disk number, a disk number virtually provided for interpretation by the server, can be set regardless of a physical disk number. The server disk mapping table also includes information on the servers to which no disk is mapped. In this case, the column 603 and the column 604 are left blank.

FIG. 7 is a diagram showing the detail of the disk mapping module 130 in the disk array device 103 shown in FIG. 1. The disk mapping module 130 maintains the mapping between the disks 131 in the disk array device 103 and the WWNs of the HBAs 120 of the servers connected to the disk array device 103 via the fiber channel. A server with a WWN, for which no mapping is established, cannot reference the disks. This allows only a particular server to access particular disks, thereby ensuring security. To set up this security, the disk mapping module 130 in this embodiment has the disk mapping table shown in FIG. 7. A column 701 indicates the WWN of an HBA of a server. A column 702 indicates the virtual disk number mapped to the WWN. A column 703 indicates the logical disk number mapped to the WWN.

FIG. 8 is a diagram showing an example of how the disk mapping is changed in the embodiment. An HBA 810 installed in a primary server 801 has a WWN1 (811), and an HBA 820 installed in a standby server 802 has a WWN2 (821). Those servers are connected to the disk array device 103 via the fiber channel switch 104. The mapping of disks is controlled by the disk mapping module 130, and a virtual disk group 803 including virtual disks 831, 832, and 833 is mapped to the WWN1 (811) of the primary server 801. The actual disks corresponding to the virtual disks 831, 832, and 833 are logical disks 804, 805, and 806 including a boot disk on which the OS and the applications installed. When the primary server 801 fails, the disk mapping module 130 maps the virtual disk group 803, which has been mapped to the primary server, to the standby server 802. In this case, the disk mapping module 130 releases the mapping between the WWN1 (811) of the primary server 801 and the virtual disk group 803 and maps the virtual disk group 803 to the WWN2 (821) of the standby server 802. This allows the standby server 802 to take over the disks including the OS and applications that have been used by the primary server 801. When the standby server 802 is started in this state, the fail over of the task from the primary server 801 is carried out.

FIG. 9 is a sequence diagram showing the fail over operation in this embodiment. The sequence diagram in this figure shows the cooperation among the primary server 801, the fail over module 110 of the management server 101, the disk mapping module 130, and the standby server 802. Step 901 indicates that a failure occurs in the primary server. The BMC of the primary server 801 or the agent program running in the primary server detects the occurrence of the failure and notifies the fail over module 110 about the failure. In step 920, the fail over module 110 detects the notified failure. Then, in step 921, the fail over module 110 acquires information on the hardware configuration and the partition configuration of the primary server. This information is acquired from the server management table shown in FIG. 4. In step 922, the primary server is shut down. If the primary server keeps on the operation, the OS or applications might execute the operation in an unstable state and might issue an invalid I/O request.

In addition, if the primary server is still in operation when the standby server takes over the task, the two servers would have the same IP address at the same time. To prevent this, the primary server must be shut down. However, the primary server, which is executing dump processing, is not shut down until the dump processing is terminated. In some cases, the fail over module 110 might request the primary server 801 to start the dump processing. In step 911, the primary server 801 that receives the shutdown request executes the shutdown processing. If the shutdown processing cannot be executed, the fail over module 110 forces the power of the primary server 801 to be turned off. The power is forced to turn off by issuing an instruction to the BMC installed in the server. In step 923, the fail over module 110 searches for a standby server, which will be able to take over the task, based on the information on the primary server acquired in step 921. To do so, the fail over module 110 searches the server management table, shown in FIG. 4, for a server that matches the primary server. Assume that a standby server 904 is searched for as a result of the search. In step 924, a disk mapping change request is issued to the disk mapping module 130 to release the disks mapped to the primary server 801 and to map those disks to the standby server 802. In step 930, the disk mapping module 130 of the disk array device executes the requested disk mapping change operation. In step 925, the fail over module 110 requests the standby server 802 to start the operation. In step 940, the standby server 802 starts the operation. Because the OS and the applications are started, the task is restarted in step 941.

The following describes the sequence in FIG. 9 more in detail. FIG. 10 is a flowchart showing the operation of the server management module 302. In step 1001, the server management module receives failure information from a server in which a failure occurred. In step 1002, the module identifies the type of failure based on the received failure information. In step 1003, the module references the failure operation table to check whether to execute the fail over operation for the type of the failure. In step 1004, the module determines whether to execute the fail over according to the content of the failure operation table. If the fail over operation is required, control is passed to step 1005 and, if not, the processing is terminated without executing any operation. In step 1005, the module shuts down the primary server. In step 1006, the server search module 303 is started. When the operation of the server search module is terminated, control is passed to step 1007. In step 1007, the standby server is started.

FIG. 11 is a flowchart showing the processing of the server search module 303. In step 1101, the server search module acquires the primary server information from the server management table. At this time, the information is acquired based on the server identifier of the primary server and the identifier of the partition to which the server belongs. In step 1102, the module searches the server management table for a free server that has the same hardware configuration and the same partition configuration as those of the primary server that have been acquired. The hardware configuration refers to the CPU type (column 402), the CPU frequency (column 403), and the memory capacity (column 404) included in the server management table shown in FIG. 4. For the partition configuration contained in the column 405, the module references only the number of servers constituting a partition as the condition but not the partition to which the server belongs. In step 1103, the module checks if a server is found as a result of the search. If a server is found, control is passed to the next step 1104. If no server is found, the processing is terminated. If no server is found, a message is usually displayed or output to the log to notify the user that no server is found. In step 1104, the server that is found is specified as the standby server. In step 1105, the disk mapping change module is started.

Figure 12:
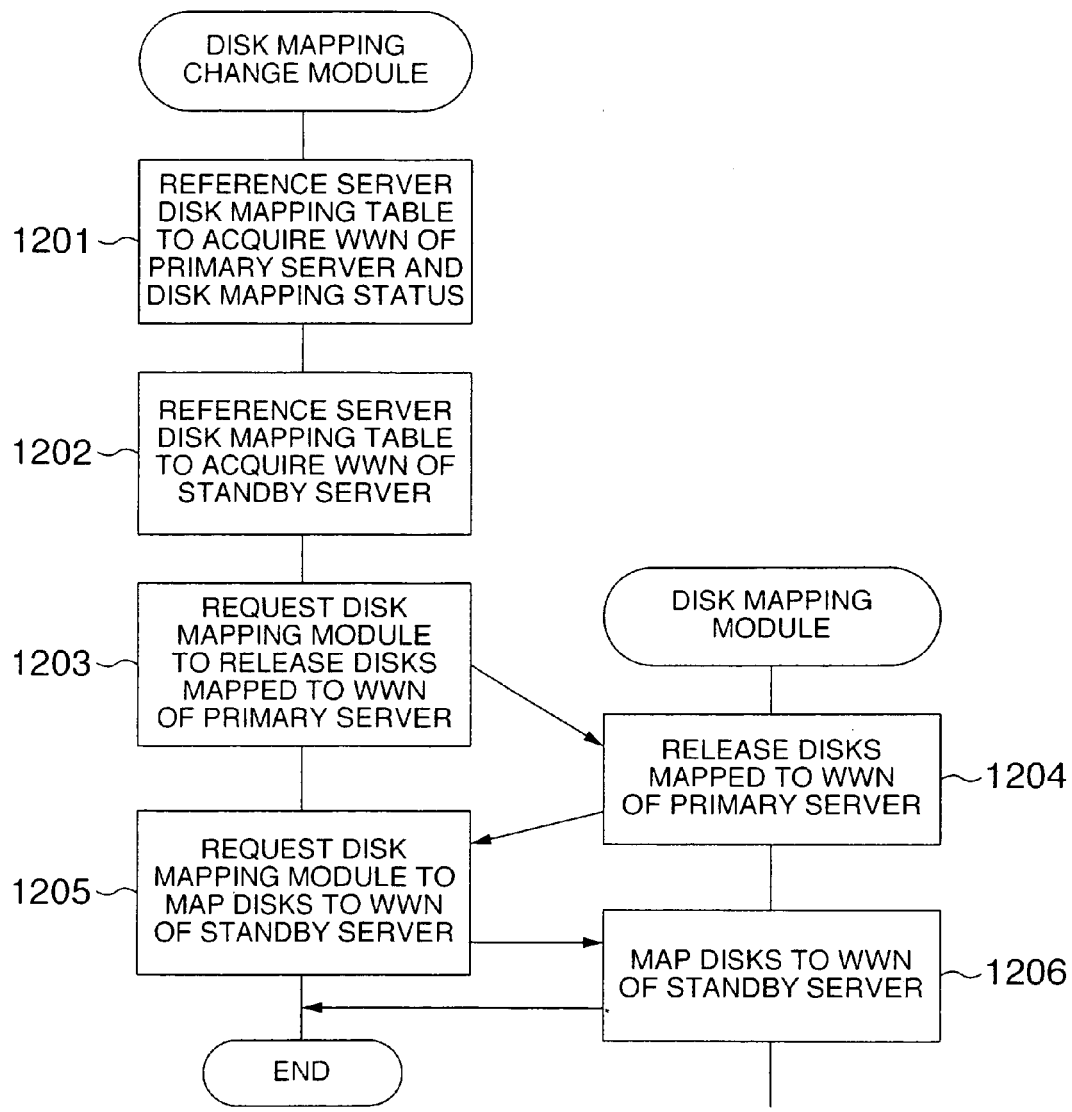
FIG. 12 is a sequence diagram of the disk mapping change module and the disk mapping module.

FIG. 12 is a diagram showing the detailed sequence of the disk mapping change module 304 of the fail over module 110 and the disk mapping module 130 of the disk array device 103. Steps 1201, 1202, 1203, and 1205 are the processing flow of the disk mapping change module 304, and steps 1204 and 1206 are the processing flow of the disk mapping module 130. In step 1201, the disk mapping change module references the server mapping table to acquire the WWN stored in the primary server and the status of the disks mapped to the WWN. In step 1202, the module references the server disk mapping table to acquire the WWN of the standby server. The acquired information is required as the arguments when a mapping change request is issued to the disk mapping module 130. In step 1203, a request is issued to the disk mapping module 130 to release the disks mapped to the WWN of the primary server. In step 1204, all disks mapped to the WWN of the primary server are released. In step 1205, a request is issued to the disk mapping module 130 to map the disks, which have been mapped to the primary server, to the WWN of the standby server. In step 1206, the disks requested to be mapped to the WWN of the standby server are mapped.

Second Embodiment

Figure 13:
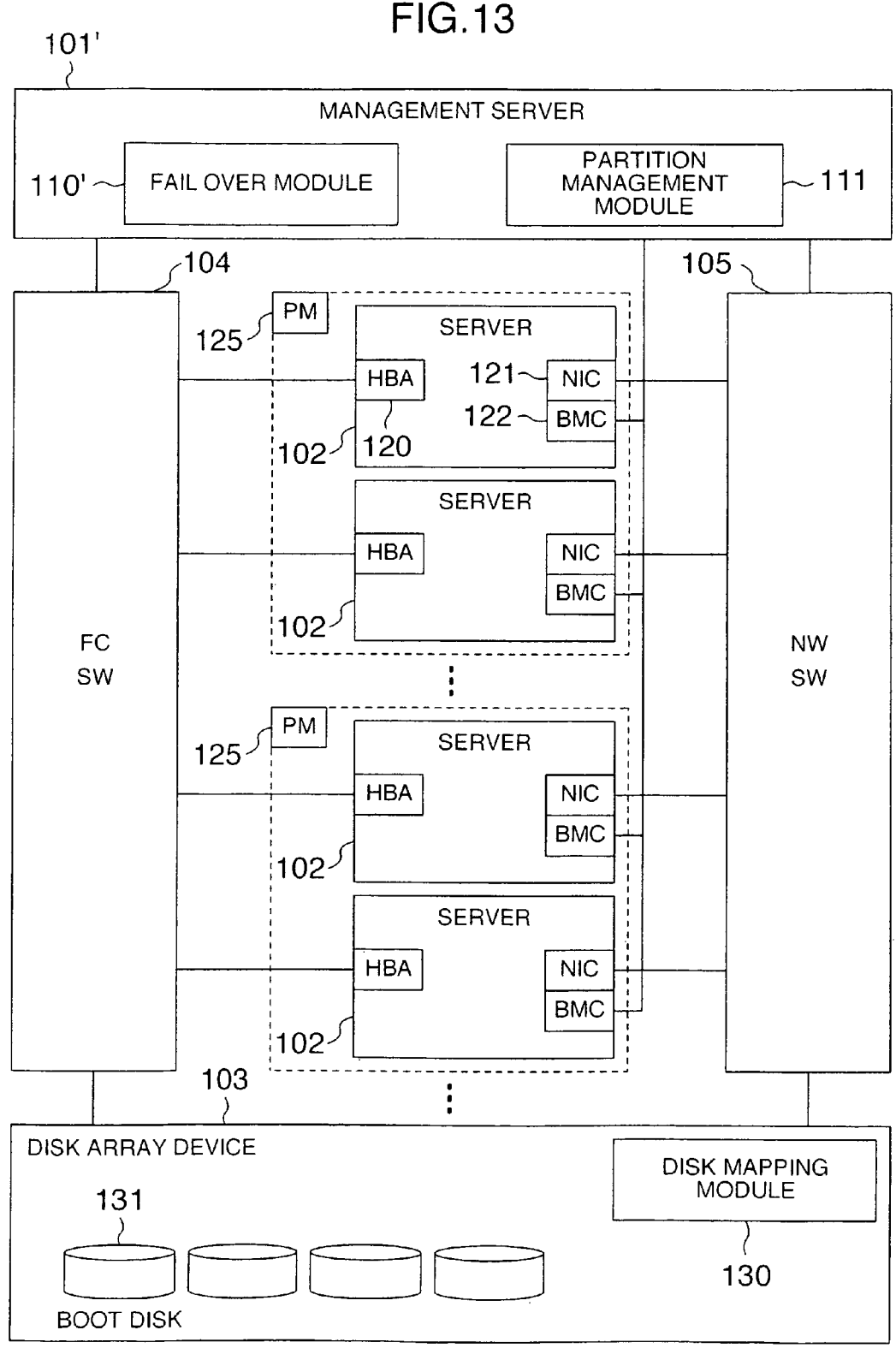
FIG. 13 is a block diagram showing the general configuration of a second embodiment of the present invention.

FIG. 13 is a diagram showing the overview of a second embodiment of the present invention. In the second embodiment, an example is shown in which a standby logical server is configured according to the partition configuration of a primary logical server. The second embodiment differs from the first embodiment in that a partition management module 111 is added to a management server 101' and in the structure of the fail over module. The partition management module 111 is a module that controls partitions, for example, creates, changes the configuration of, and deletes a logical server. A fail over module 110' works with the partition management module 111 to implement a function to automatically configure the partition of a standby logical server.

Figure 14:
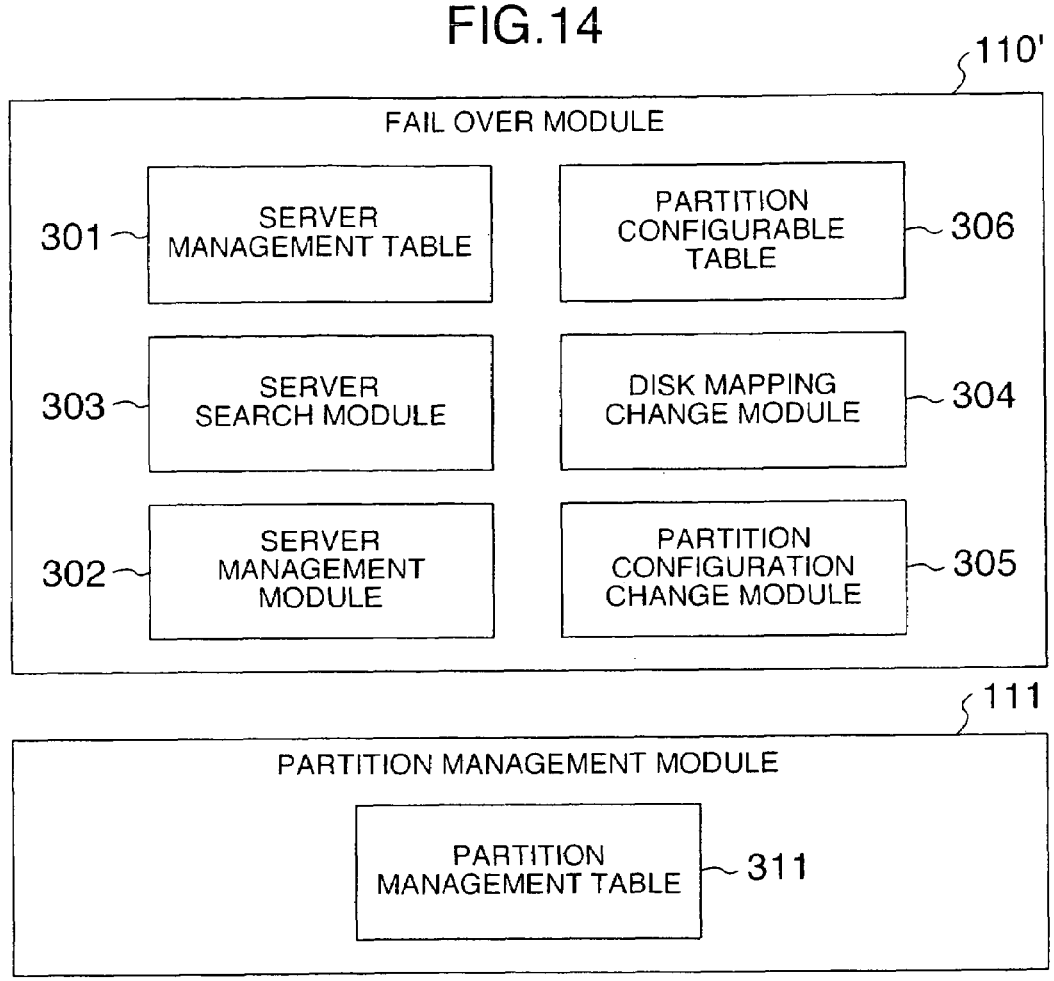
FIG. 14 is a functional block diagram showing the configuration of a management server in the embodiment described above.

FIG. 14 is a diagram showing the configuration of the management server 101' in the second embodiment. As shown in the figure, the management server 101' is the management server 101 in the first embodiment to which the partition management module 111 is added. The fail over module 110' is structured by adding a partition configuration change module 305 and a partition configurable table 306 to the fail over module 110 in the first embodiment. The partition configuration change module 305 is a functional module that requests the partition management module 111 to change the configuration of a logical server, which will be used as a standby server, so that the partition configuration of the primary logical server becomes equal to the partition configuration of the standby logical server. To make the partition configurations equal is to make the number of servers of the primary logical server equal to the number of servers of the standby logical server. For example, if the primary server is a logical server composed of two servers, the standby server is set up as a logical server also composed of two servers. The partition configurable table 306 is a table in which combinations of servers that can configure a logical server in the system are listed. The partition configuration change module 305 references the partition configurable table 306 to search for a combination of servers that can configure a logical server whose partition configuration is the same as that of the primary logical server. The partition management module 111 includes a partition management table 311. The partition management module 111 references the partition management table 311 to manage the current partition configuration.

FIG. 15 is a diagram showing the detail of the partition configurable table 306 in FIG. 14. A column 1501 indicates the number of servers configuring a logical server. A column 1502 indicates combinations of servers that can configure a logical server. In the example shown in FIG. 15, the combination of S2 and S3, the combination of S6 and S7, and the combination of S11 and S12 can form a logical server configured by two servers. Although the server identifier of a logical server configured by one server is not described in this embodiment, it is possible to include such server identifiers in this table.

FIG. 16 is a diagram showing the detail of the partition management table 311 in FIG. 14. A column 1601 indicates a partition identifier. This identifier is given to each logical server. A column 1602 indicates the servers configuring a logical server.

Figure 17:
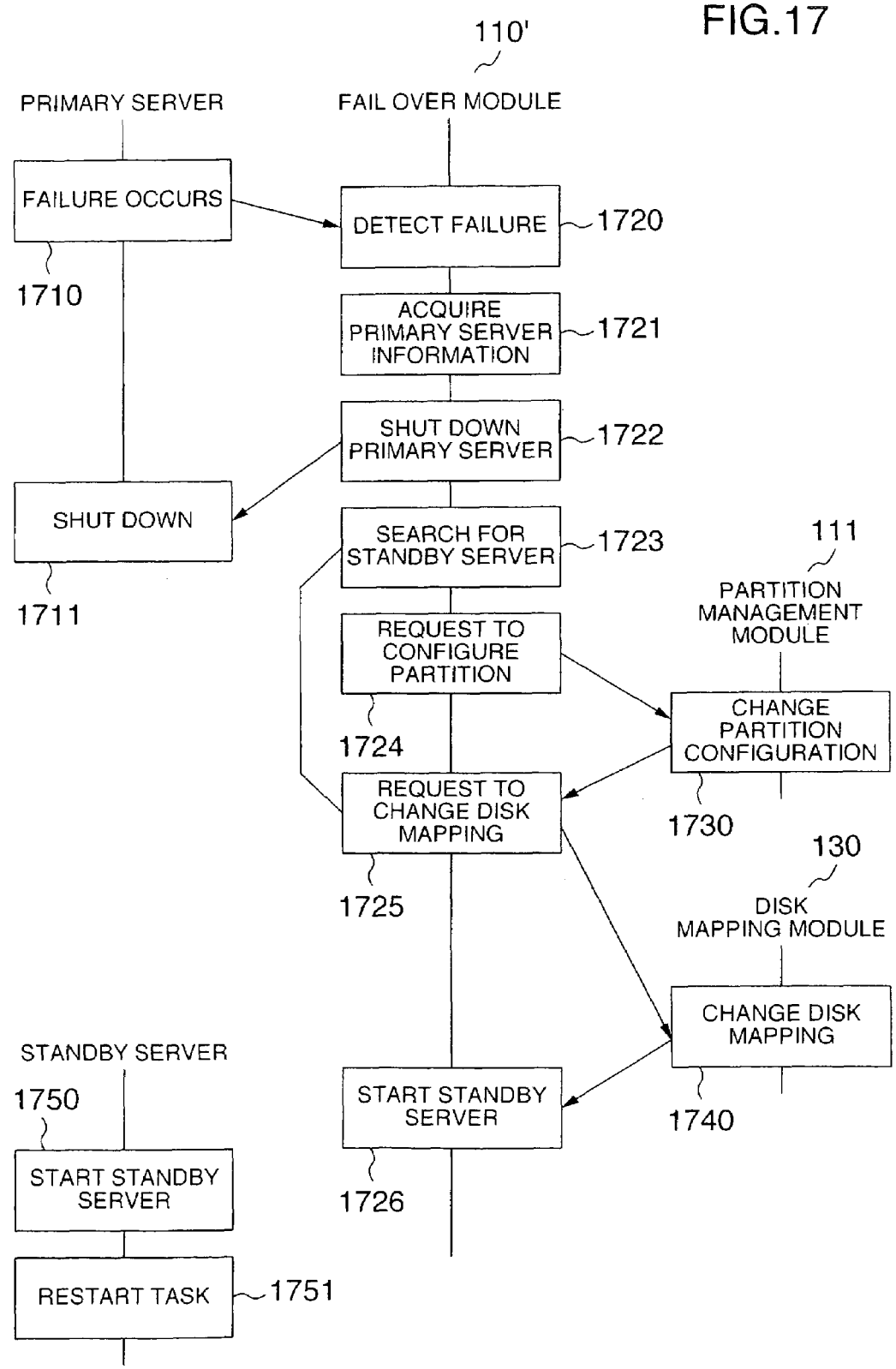
FIG. 17 is a sequence diagram showing the operation of the embodiment described above.

FIG. 17 is a sequence diagram showing the fail over operation in the second embodiment. The sequence diagram shown in the figure shows the cooperative operation of the primary server, the fail over module 110', the partition management module 111, the disk mapping module 130, and the standby server. This sequence diagram differs from that of the first embodiment in that two steps are added: step 1724 in which a partition configuration request is issued and step 1730 in which the partition configuration is changed. The detail of the search for a standby server in step 1723 also differs from that in the first embodiment. In step 1723, the fail over module 110' searches for a set of free servers with the same partition configuration as that of the primary logical server. If such a set of servers is found, the module releases the disks mapped to the primary server and passes control to step 1725 in which a request is issued to map the released disks to the free servers that are found. On the other hand, if such a set of free servers with the same partition configuration as that of the primary logical server is not found, the module searches for a set of servers that can configure a logical server with the same partition configuration as that of the primary logical server. For example, if the primary server is a logical server configured by two servers, the module searches for two servers that have the same hardware configuration as that of the two servers and that can configure a logical server. If such servers are found, the module passes control to step 1724 to request the partition management module 111 to configure a logical server using the servers that are found. In step 1730, the partition management module 111 changes the configuration of the partitions in response to the request issued in step 1724.

Figure 18:
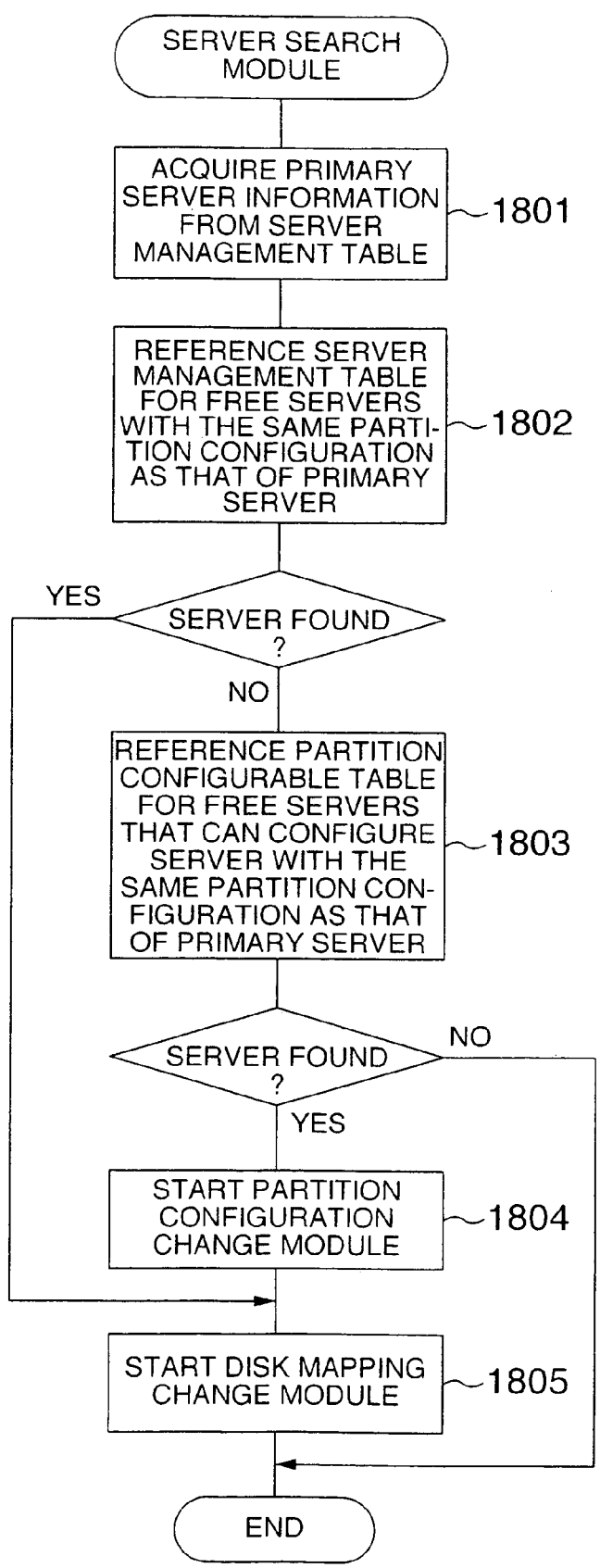
FIG. 18 is a flowchart showing the processing of a server search module in the embodiment described above.

FIG. 18 is a flowchart showing the processing of the server search module 303 in the second embodiment. In step 1801, the module acquires primary server information from the server management table. At this time, the module acquires the information based on the server identifier of the primary server and the identifier of the partition to which the server belongs. In step 1802, the module searches the server management table for a combination of free servers (standby logical server) with the same hardware configuration and the same partition configuration as those of the servers configuring the primary server. If such a set of servers is not found, control is passed to step 1803. In step 1803, the module searches for a combination of servers that has the same hardware configuration as that of the servers configuring the primary server and that can configure a logical server. For example, if the primary server is a logical server configured by two servers, the module first searches the server management table 301 for servers each with the same hardware configuration as that of any of the two servers of the primary logical server and then searches the partition configurable table 306 for a set of two servers that are servers searched for from the server management table 301 and that can configure a logical server. If such servers are found, control is passed to the next step 1804 to start the partition configuration change module. Next, in step 1805, the disk mapping module is started to change the disk mapping. If a standby logical server is found in the preceding step 1802, control is passed to step 1805 without starting the partition configuration change module in step 1804.

If a set of servers satisfying the condition can be found neither in step 1802 nor in step 1803, the fail over operation is terminated. If a set of servers cannot be found, a message is usually displayed or output to the log to notify the user that no set is found.

Figure 19:
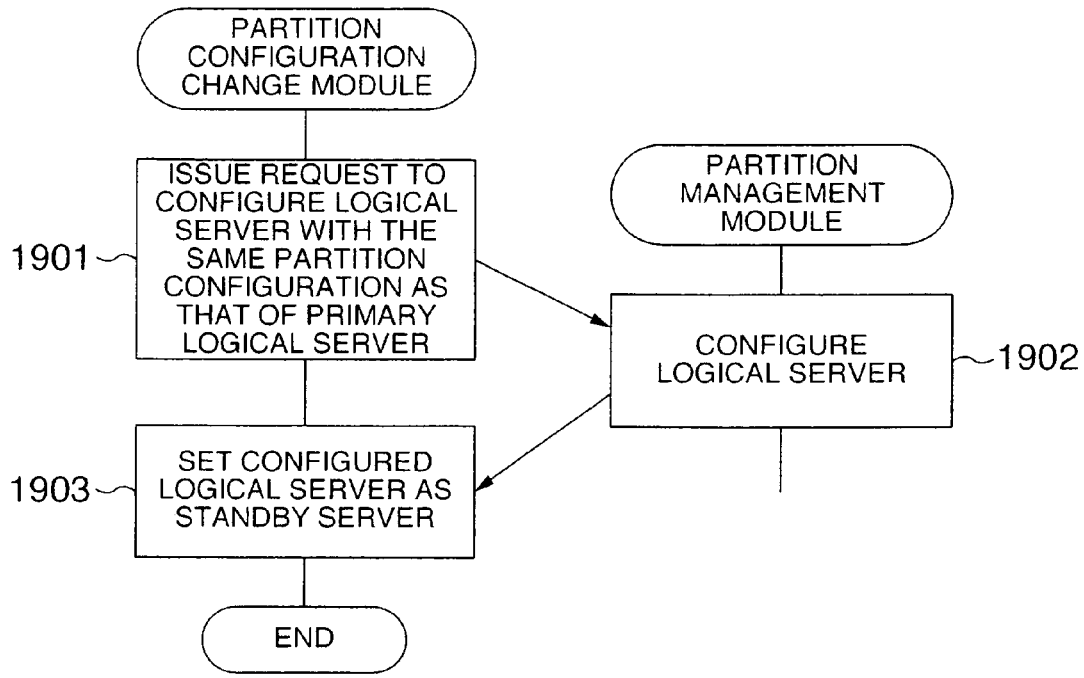
FIG. 19 is a sequence diagram of a partition configuration change module and a partition management module in the embodiment described above.

FIG. 19 is a diagram showing the detailed sequence of the partition configuration change module 305 and the partition management module 111. Steps 1901 and 1903 are the processing flow of the partition configuration change module 305, and step 1902 is the processing flow of the partition management module 111. In step 1901, the partition configuration change module 305 uses a set of servers to request the partition management module 111 to configure a logical server having the same partition configuration as that of the primary logical server. In step 1902, the partition management module 111 configures the logical server. In step 1903, the partition configuration change module 305 sets the configured logical server as the standby server.

Third Embodiment

In a third embodiment of the present invention, an example is shown in which a search policy is used when searching for a standby server. By using the search policy, a task can be taken over even if the partition configuration and the hardware configuration of a primary server do not completely match those of a standby server. For example, because a slight difference in the CPU frequency and the memory capacity can be accommodated by software, the task can be taken over even if they do not match completely.

Figure 20:
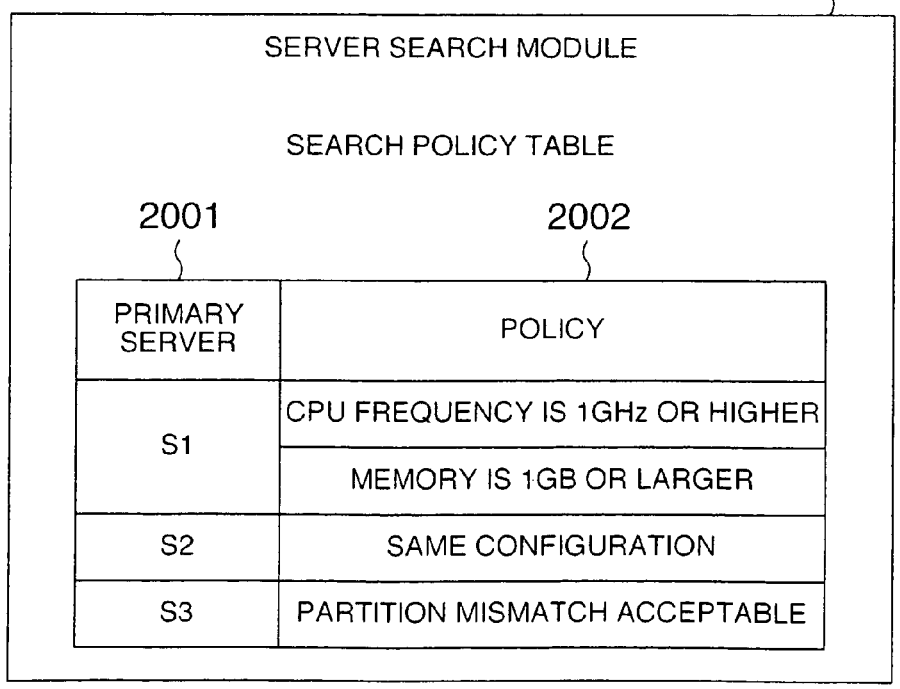
FIG. 20 is a functional block diagram showing the configuration of a server search module in a third embodiment of the present invention.

FIG. 20 is a diagram showing a server search module 303' in the third embodiment of the present invention. The server search module 303' in the third embodiment is the server search module 303 in the first and second embodiments to which a search policy table is added. The search policy table contains a policy to be satisfied by a standby server in order to make the standby server compatible with the primary server. A server that satisfies this policy can be used as a standby server even if the server has not completely the same hardware configuration and the partition configuration as those of the primary server. A column 2001 indicates the server identifier of a primary server. A column 2002 indicates a search policy. Conditions that can be specified for a policy include the conditions shown in FIG. 20; for example, the CPU frequency and the memory must be higher than a predetermined value or the task can be taken over even if the partition configurations are different. When searching for a server to be used as a standby server, the server search module 303' references this search policy table. The user can rewrite the search policy table. For example, GUIs, commands, and setting files are provided to allow the user to specify a search policy.

FIG. 21 is a flowchart showing the processing flow of the server search module 303' in the third embodiment of the present invention. This flowchart differs from that of the first and second embodiments in that a search policy is used in step 2102. In step 2102, the server search module 303' references the policy of the primary server included in the search policy table and searches the server management table 301 for a server that can be used as a candidate for the standby server.

Fourth Embodiment

In a fourth embodiment of the present invention, a method is shown in which the task of a failed server is taken over by forcing another task, whose priority is lower than the task of the failed server, to give up the server even when there is no free server in the system.

FIG. 22 is a diagram showing a server management table in the fourth embodiment of the present invention. This table differs from that of other embodiments in a column 407 and a column 408. The column 407 indicates the type of task running in a server. Other than the types used in this example, a task ID may also be used to show the task type. The column 408 indicates the priority of the task in the column 407. In this example, the priority is shown as high, medium, and low. "High" indicates that the priority is high, while "low" indicates that the priority is low. The task priority is specified by the user. GUIs and commands are provided, and a setting file is prepared, to allow the user to specify the priority.

FIG. 23 is a processing flowchart of a server search module in the fourth embodiment of the present invention. This flowchart differs from that of the other embodiments in step 2302. In step 2302, the server search module searches not only for a free server but also for a server in which a task, whose priority is lower than that of the task running in the primary server, is running. To set up a server, in which some other task is running, as a standby server, the other task is forced to give up the server. For example, if the server S5 fails in the example in FIG. 22, the task in the server S4, whose priority is lower than that of the task in the server S5, is forced to give up the server S4. If a task that is forced to give up the server uses another server, it is possible to execute scale-in or scale-down for the task. In addition, if the servers become insufficient and a standby server cannot be configured, a logical server can also be configured by using a server that is given up by some other task. There is also a method for taking over a task, which has been executed in a server that the task is going to give up, before giving up the server. For example, if the server S4 is used as the standby server of the server S5 in FIG. 23, the task of the server S4 is first taken over to a free server S12 and then the task of the server S5 is taken over to the server S4. Here, it is assumed that, although the servers S4 and S12 have different hardware configurations, the task can be taken over by a search policy shown in the third embodiment. This operation is equivalent to the operation in which the fail over processing according to the present invention is executed twice.

Fifth Embodiment

Figure 24:
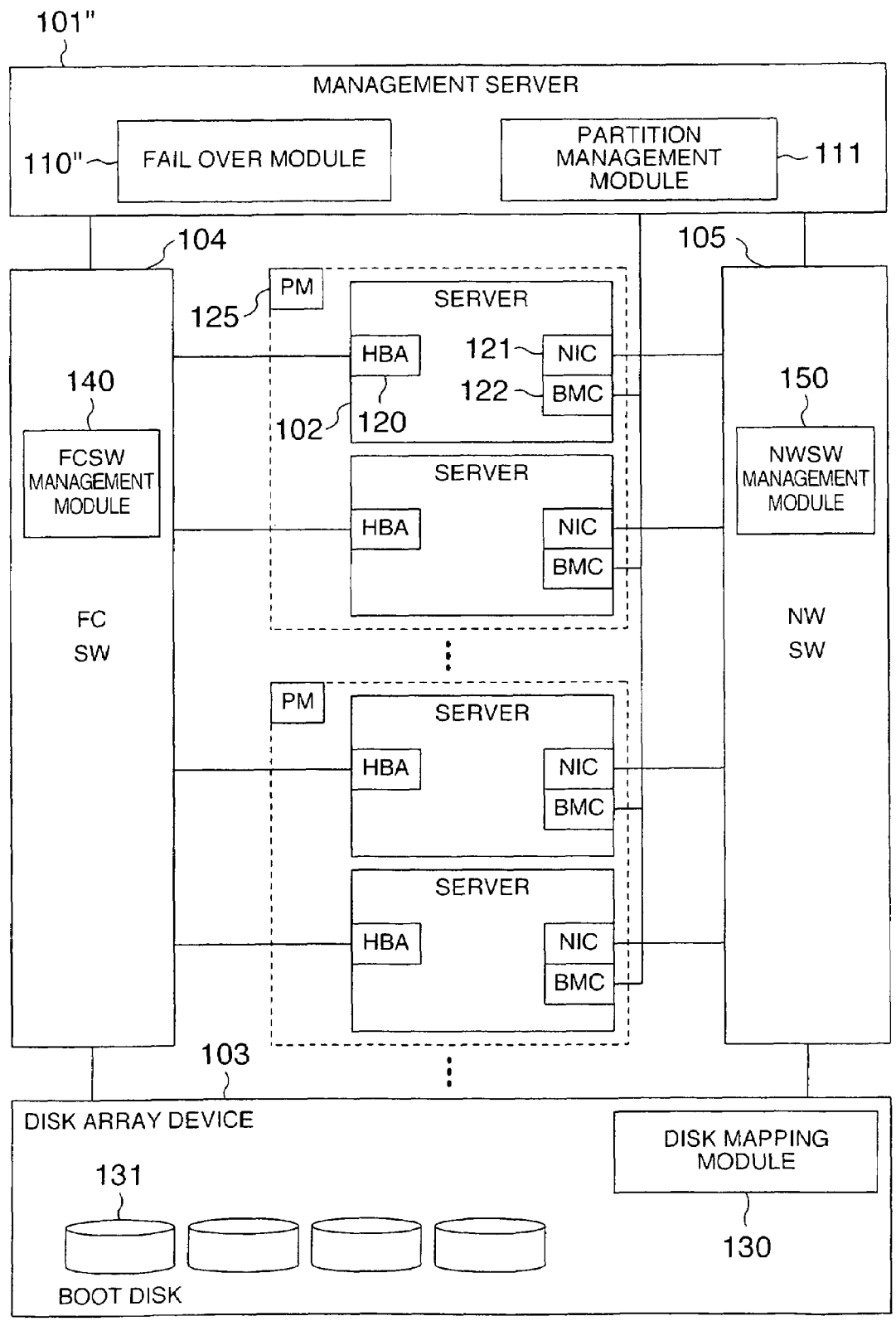
FIG. 24 is a block diagram showing the general configuration of a fifth embodiment of the present invention.

FIG. 24 is a diagram showing the general configuration of a fifth embodiment of the present invention. This embodiment differs from the first embodiment in that an FCSW management module 140 is added to the FCSW 104 and an NWSW management module 150 is added to the NWSW 105. The FCSW management module 140 controls the security module that allocates a zone to each FCSW connection port or to each WWN of a server-installed HBA to prevent a server belonging to a zone from accessing a disk in another zone. The NWSW management module 150 controls the security module that assigns a VLAN ID to each NWSW connection port or to each server-installed NIC to divide the network on a VLAN ID basis. The method in the fifth embodiment makes it possible to search for a standby server when the FCSW 104 or the disk array device 103 to which a standby server is connected differs from that of a primary server or when the zone of the FCSW 104 or the VLAN ID of the NWSW 105 differs between the servers.

Figure 25:
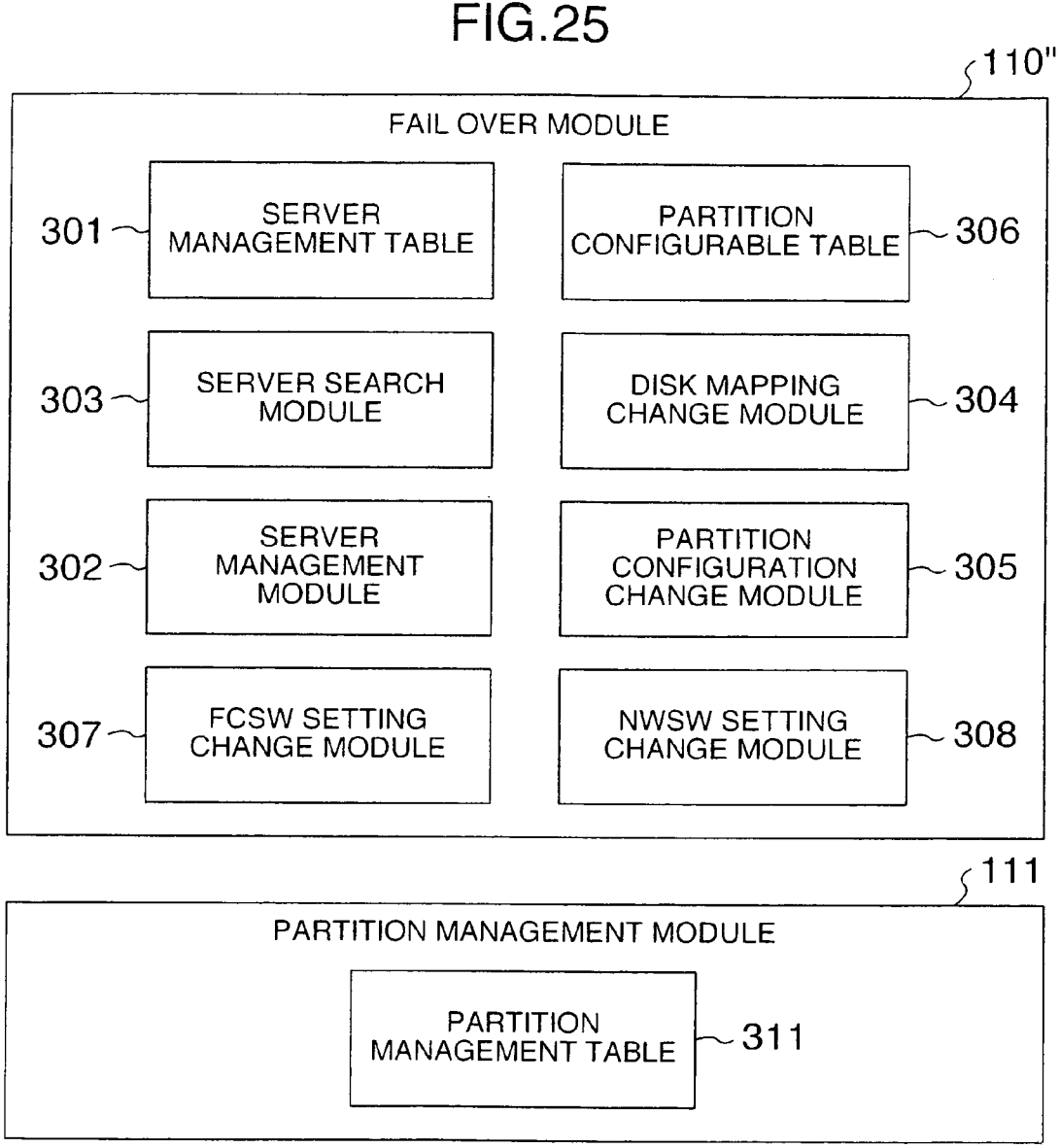
FIG. 25 is a functional block diagram showing the configuration of a management server in the embodiment described above.

FIG. 25 is a diagram showing the configuration of a management server 101" in the fifth embodiment of the present invention. This configuration differs from that of the other embodiments in that an FCSW setting change module 307 and an NWSW setting change module 308 are added to a fail over module 110" of the management server 101". The FCSW setting change module 307 is a functional module that, when the zone of a standby server differs from that of a primary server, requests the FCSW management module 140 to change the setting so that the zones match. The NWSW setting change module 308 is a functional module that, when the VLAN ID of a standby server differs from that of a primary server, requests the NWSW management module 150 to change the setting so that the VLAN IDs match. The FCSW setting change module 307 and the NWSW setting change module 308 are started when the server search module 303 finds a standby server.

FIG. 26 is a diagram showing a server management table 301 in the fifth embodiment of the present invention. A column 409 indicates the type of chip set of a server. The model name of a server may also be specified in this column if it uniquely identifies its chip set. Because the task cannot be taken over in some cases if the chip set differs between the primary server and the standby server, the server search module checks this column to search for a server that has a matching chip set type. A column 410 indicates the number of NIC ports installed in the server. A column 411 indicates the number of HBA ports installed in the server. Because the task cannot be taken over in some cases if the number of I/O ports differs between the primary server and the standby server specified in the column 410 and the column 411, these columns are used when searching for a standby server. A column 412 contains the VLAN ID of the server. Even if the VLAN ID differs between the primary server and the standby server, the task can be taken over by making the VLAN ID of the standby server equal to that of the primary server by the NWSW setting change module 308. A column 413 contains the identifier of a zone to which the server belongs. Even if the zone differs between the primary server and the standby server, the task can be taken over by making the zone of the standby server equal to that of the primary server by the FCSW setting change module 307. A column 414 indicates the connected-to NWSW of the server. Because the task cannot be taken over in some cases when the connected-to NWSW differs between the primary server and the standby server, this column is used when searching for a standby server. A column 415 indicates the connected-to disk array device of the server. Because the boot disk of the primary server cannot be accessed from the standby server if the connected-to disk array device differs between the primary server and the standby server, the task cannot be taken over. To prevent this condition, this column is used when searching for a standby server. In addition, information on the connected-to port of the server and the disk array device as well as the information on the connected-to controller of the disk array device can also be added to the server management table 301.

The server search method according to this patent can be applied not only to the fail over operation but also to the search of a server to be used for scaling out or scaling up a task in a load-balancing system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A fail over method, implemented in a computer system in which a plurality of servers are connected to an external disk device via a network and each of said servers can be started by booting an operating system from said external disk device, for taking over task processing from a primary server to some other server in said computer system when said primary server executing a task fails, said fail over method comprising the steps of:

detecting that said primary server has failed;

determining the servers in said computer system for a server that can take over the failed primary server under a search condition which includes hardware configuration as that of the failed primary server and that the server is not running a task;

enabling a server, found as a result of the determination, to access said external disk device; and booting said server, found as a result of the search, from said external disk device.

2. The fail over method according to claim 1, wherein the step of determining comprises the step of:

referencing a table indicating server search policies for determining a server that will take over the failed primary server according to the policies stored in said table.

3. The fail over method according to claim 1, wherein the step of determining comprises the step of:

determining the servers in the computer system for a server under said search condition as well as a condition that a network connection device is the same as that of the failed primary server.

4. A fail over method, implemented in a computer system in which a plurality of servers are connected to an external disk device via a network and each of said servers can be started by booting an operating system from said external disk device, for taking over task processing from a primary server to some other server in said computer system when said primary server executing a task fails, said fail over method comprising the steps of:

detecting that said primary server has failed;

determining the servers in said computer system for a server that can take over the failed primary server under a search condition which includes hardware configuration as that of the failed primary server and that the server is not running a task;

enabling a server, found as a result of the determination, to access said external disk device; and booting said server, found as a result of the search, from said external disk device, wherein in the step of determining the servers in said computer system for a server that can take over the failed primary server, the determined server and the primary server is the same in number of Input/Output (I/O) ports.

5. The fail over method according to claim 4, wherein said number of Input/Output (I/O) ports indicates a number of Host Bus Adapter (HBA) ports.

6. The fail over method according to claim 4, wherein said number of Input/Output (I/O) ports indicates a number of Network Interface Card (NIC) ports.

* * * * *